US012651712B2

(12) United States Patent
Matsumoto

(10) Patent No.: US 12,651,712 B2
(45) Date of Patent: Jun. 9, 2026

(54) ELECTROLYTIC CAPACITOR

(71) Applicant: Panasonic Intellectual Property Management Co., Ltd., Osaka (JP)

(72) Inventor: Takayuki Matsumoto, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 106 days.

(21) Appl. No.: 18/709,837

(22) PCT Filed: Dec. 6, 2022

(86) PCT No.: PCT/JP2022/044836
§ 371 (c)(1),
(2) Date: May 14, 2024

(87) PCT Pub. No.: WO2023/106281
PCT Pub. Date: Jun. 15, 2023

(65) Prior Publication Data
US 2025/0014836 A1 Jan. 9, 2025

(30) Foreign Application Priority Data
Dec. 9, 2021 (JP) ................................. 2021-200153

(51) Int. Cl.
*H01G 9/052* (2006.01)
*H01G 9/012* (2006.01)

(52) U.S. Cl.
CPC ........... *H01G 9/0525* (2013.01); *H01G 9/012* (2013.01)

(58) Field of Classification Search
CPC ............................. H01G 9/0525; H01G 9/012
See application file for complete search history.

(56) References Cited

U.S. PATENT DOCUMENTS

2009/0147447 A1* 6/2009 Matsuoka .............. H01G 9/012
361/540
2012/0275083 A1* 11/2012 Yamanaka .............. H01G 9/028
29/25.03

(Continued)

FOREIGN PATENT DOCUMENTS

CN 100538941 C * 9/2009 .............. H01G 9/08
JP 2004-071843 3/2004

(Continued)

OTHER PUBLICATIONS

International Search Report of PCT application No. PCT/JP2022/044836 dated Feb. 28, 2023.

*Primary Examiner* — Michael P McFadden
(74) *Attorney, Agent, or Firm* — WHDA, LLP

(57) ABSTRACT

An electrolytic capacitor including-includes an anode body that is porous, an anode wire including a buried part buried in the anode body and a protrusion part protruding to an outside of the anode body, a dielectric layer disposed on a surface of the anode body, a cathode part covering at least a part of the dielectric layer, an anode terminal electrically connected to the anode wire, and a cathode terminal electrically connected to the cathode part. A corner defined by three sides of the anode body is chamfered by an intersecting surface intersecting each of the three sides, the three sides intersecting each other. The protrusion part is protruded from the intersecting surface and is connected to the anode terminal.

6 Claims, 7 Drawing Sheets

(56)                    References Cited

U.S. PATENT DOCUMENTS

2013/0050904 A1*    2/2013    Nemoto ................... H01G 9/04
                                                              361/528
2020/0020486 A1*    1/2020    Eidelman ............... H01G 9/035

FOREIGN PATENT DOCUMENTS

JP           2012-238803          12/2012
WO       WO-2010134335  A1  *  11/2010    ............. H01G 9/012

* cited by examiner

ELECTROLYTIC CAPACITOR

CROSS-REFERENCE TO RELATED APPLICATIONS

This application is a U.S. national stage application of the PCT International Application No. PCT/JP2022/044836 filed on Dec. 6, 2022, which claims the benefit of foreign priority of Japanese patent application No. 2021-200153 filed on Dec. 9, 2021, the contents all of which are incorporated herein by reference.

TECHNICAL FIELD

The present invention relates to an electrolytic capacitor.

BACKGROUND

In recent years, a solid electrolytic capacitor that has a small equivalent series resistance (ESR) and excellent frequency characteristics has been developed. The solid electrolytic capacitor includes a porous anode body, a dielectric layer formed on a surface of the anode body, and a solid electrolyte layer covering at least a part of the dielectric layer.

As the anode body, a sintered body of a molded body of metal particles is used. The molded body is typically manufactured by disposing an anode lead at a predetermined position of a mold, charging metal particles into the mold, and performing pressure molding.

Unexamined Japanese Patent Publication No. 2012-238803 discloses a solid electrolytic capacitor including a capacitor element, a resin package covering the capacitor element, an anode wire having one end in a longitudinal direction connected to the capacitor element, and an anode member electrically connected to the anode wire. The resin package includes a first side surface having a side extending long in a first direction, and a second side surface having a side extending long in a second direction orthogonal to the first direction. Both the first side surface and the second side surface include a side extending long in a third direction orthogonal to the first direction and the second direction. The capacitor element includes a first surface parallel to the first side surface, a second surface parallel to the second side surface, and a third surface sandwiched between the first surface and the second surface as viewed in a longitudinal direction of the anode wire, in which the anode wire is protruded from the third surface.

Unexamined Japanese Patent Publication No. 2004-71843 proposes a solid electrolytic capacitor including a capacitor element in which a part of an anode lead is inserted into an anode body, a cathode layer formed on a peripheral surface of the anode body via an insulating film, an anode side lead frame attached to the anode lead, and a cathode side lead frame attached to the cathode layer, in which both the lead frames are provided substantially horizontally below the capacitor element, the cathode side lead frame is connected to the cathode layer on a lower surface of the capacitor element, and the anode lead extends obliquely downward with respect to the anode side lead frame and is in contact with the anode side lead frame.

SUMMARY

One aspect of the present invention relates to an electrolytic capacitor including an anode body that is porous, an anode wire including a buried part buried in the anode body and a protrusion part protruding to an outside of the anode body, a dielectric layer disposed on a surface of the anode body, a cathode part covering at least a part of the dielectric layer, an anode terminal electrically connected to the anode wire, and a cathode terminal electrically connected to the cathode part. A corner defined by three sides of the anode body is chamfered by an intersecting surface intersecting each of the three sides, the three sides intersecting each other. The protrusion part is protruded from the intersecting surface and is connected to the anode terminal.

Advantageous Effect of Invention

According to the present disclosure, it is possible to provide an electrolytic capacitor suitable for achieving both high capacitance and downsizing.

Although novel features of the present invention are set forth in the appended claims, the present invention will be better understood by the following detailed description with the drawings, taken in conjunction with other objects and features of the present invention, both as to construction and content.

DESCRIPTION OF EMBODIMENT

Figure 1:
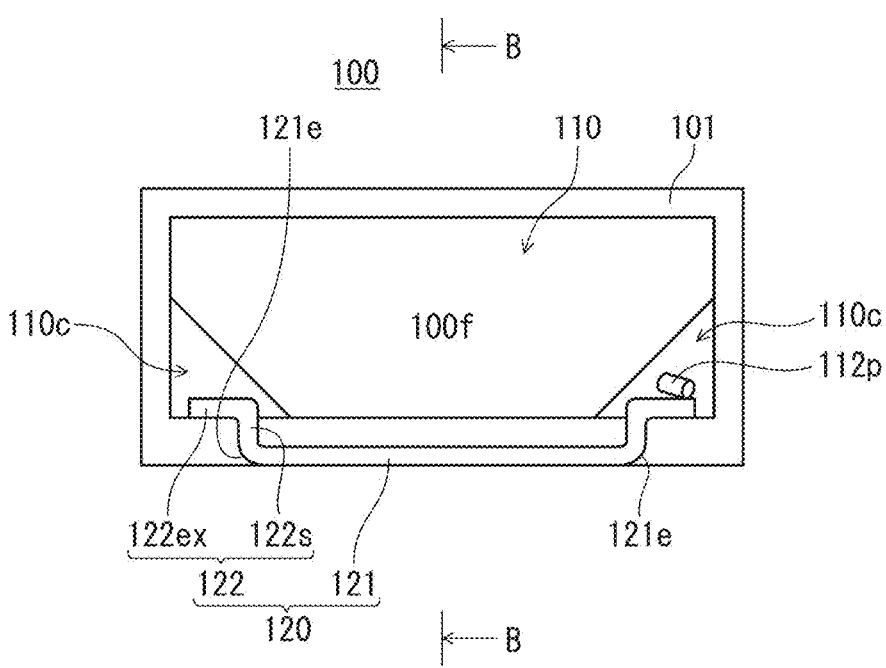
FIG. 1 is a schematic front view illustrating an example of an electrolytic capacitor according to an exemplary embodiment of the present disclosure seen through an outer package.

Hereinafter, an exemplary embodiment of the present disclosure will be described with reference to examples, but the present disclosure is not limited to examples described below. In the following description, specific numerical values and materials may be provided as examples, but other numerical values and materials may be applied as long as the effect of the present disclosure can be obtained. Constituent elements of known electrolytic capacitors may be applied to the constituent elements of the present disclosure other than parts that are characteristic of the present disclosure. The term, a "range from numerical value A to numerical value B", herein means that numerical value A and numerical value B are included in the range.

The present disclosure encompasses a combination of matters recited in two or more claims freely selected from a plurality of claims recited in the appended claims. That is, as long as no technical contradiction arises, matters recited in two or more claims freely selected from a plurality of claims recited in the appended claims can be combined.

The "electrolytic capacitor" may be read as a "solid electrolytic capacitor".

[Electrolytic Capacitor]

An electrolytic capacitor (or solid electrolytic capacitor) according to the present disclosure includes a capacitor element including a porous anode body, an anode wire, a dielectric layer disposed on a surface of the anode body, and a cathode part covering at least a part of the dielectric layer. The shape, size, and the like of the capacitor element are not particularly limited, and the capacitor element may be a known capacitor element or a capacitor element that has a configuration similar to a known capacitor element.

The capacitor element includes an anode part and a cathode part. The anode body and the anode wire constitute the anode part. The anode wire includes a buried part buried in the anode body and a protrusion part protruding to the outside of the anode body. The configuration of the cathode part is not particularly limited, and the cathode part may be a known cathode part or a cathode part that has a configuration similar to a known cathode part.

An electrolytic capacitor typically includes an outer package disposed around a capacitor element. The outer package is made of, for example, a resin composition containing a resin and an insulating filler.

The electrolytic capacitor includes an anode terminal electrically connected to an anode part (specifically, an anode wire) of the capacitor element, and a cathode terminal electrically connected to the cathode part. A part of each of the anode terminal and the cathode terminal may extend to the outside of the outer package. That is, each of the anode terminal and the cathode terminal includes an internal terminal part and an external terminal part. The internal terminal part is buried in the outer package, and at least a part of the external terminal part is exposed to the outside from the outer package.

The internal terminal part is a portion that cannot be visually recognized from the outside of the outer package. The external terminal part is a portion that can be visually recognized from the outside of the outer package. For example, when the anode terminal or the cathode terminal has a plate-like portion, one surface of the plate-like portion is in contact with the outer package, and the remaining surface can be visually recognized from the outside of the outer package, such a plate-like portion is the external terminal portion.

Each of the anode terminal and the cathode terminal forms a conductive path that electrically connects between the inside and the outside of the outer package. The internal terminal part of the anode terminal includes a connecting part with the anode wire. The connecting part is connected to the anode wire by welding, for example. The internal terminal part of the cathode terminal has a connection surface with the cathode part. The connection surface is connected to the cathode part via a conductive member.

In the electrolytic capacitor according to the present disclosure, in the capacitor element, a corner defined by three sides of the anode body is chamfered by an intersecting surface intersecting with each of the three sides. The three sides intersect with each other. The intersecting surface may be a plane, a curved surface, or other surfaces. The intersecting surface may be an uneven surface including at least one plane and at least one curved surface.

For example, in the case of an approximately rectangular parallelepiped or a hexahedral anode body, there are eight corners each defined by three sides intersecting with each other. In this case, at least one of the eight corners is chamfered. The protrusion part of the anode wire is protruded from at least one of such intersecting surfaces.

When the capacitor element has only one anode wire, the protrusion part of the anode wire is protruded from only one intersecting surface even when there are a plurality of intersecting surfaces. The number of protrusion parts may be two or more depending on the shape and the number of anode wires, but usually one capacitor element has only one protrusion part. Such a protrusion part is connected to the anode terminal.

The internal terminal part is connected to the capacitor element sealed inside the outer package. The external terminal part serves as a terminal electrode for electrically connecting the electrolytic capacitor to a circuit member. The circuit member includes a substrate and an electronic component. An electrolytic capacitor is used typically by being mounted on a circuit member.

Hereinafter, a facing surface of the electrolytic capacitor facing the circuit member when the electrolytic capacitor is mounted on the circuit member is also referred to as a mounting surface (or bottom surface). In the case of an approximately rectangular parallelepiped or a hexahedral anode body, one of the six surfaces is disposed close to the mounting surface. The intersecting surface from which the protrusion part of the anode wire is protruded is desirably provided at a corner disposed close to the mounting surface from the viewpoint of shortening the conductive path. It is desirable that the protrusion part is inclined to extend from such an intersecting surface toward the mounting surface and is connected to the internal terminal part of the anode terminal disposed close to the mounting surface.

As viewed from a surface of the anode body that is not adjacent to the intersecting surface, the protrusion part is desirably hidden by the anode body. In other words, it is desirable that the protrusion part is housed in a notched space formed by the intersecting surface and the corner chamfered by the intersecting surface. The notched space is a triangular pyramidal space defined by the intersecting surface and the corner. The notched space does not exist in a typical capacitor element, and is occupied by a part (corner) of the anode body. By housing the protrusion part in the notched space, it is possible to maximize the percentage of the volume of the anode body to the volume of the electrolytic capacitor (hereinafter, the percentage is also referred to as volume efficiency). The volume of the notched space may be, for example, less than or equal to 10%, less than or equal to 5%, or less than or equal to 3% of the volume of the anode body.

Two intersecting surfaces may be disposed at respective both ends of one of three sides intersecting each other of the anode body. In this case, the anode body has at least two notched spaces, and has a shape with good symmetry. For the same reason, it is desirable that both of the two intersecting surfaces are provided at the corners close to the mounting surface. The protrusion part may be protruded from only one of the two intersecting surfaces.

When the outer package has a bottom surface (or a mounting surface) and an upper surface opposite to the bottom surface, the anode terminal may include a bottom-side terminal part (at least a part of the external terminal part) exposed at the bottom surface, and two anchor parts (at least a part of the internal terminal part) extending from the bottom-side terminal part and buried in the outer package. In this case, each of two anchor parts may extend toward a corresponding one of two intersecting surfaces, and the protrusion part may be connected to a corresponding one of the anchor parts. This makes it possible to use the anchor part as a connecting part with the anode wire. At least a part of such a connecting part may be housed in the notched space. As a result, the volume efficiency of the electrolytic capacitor is further enhanced.

The shape of the bottom-side terminal part is not particularly limited, but the bottom-side terminal part may have two end sides facing each other. In this case, each of the two anchor parts (at least a part of the internal terminal part) may include an upright part rising from one of the two end sides of the bottom-side terminal part toward the upper surface, and an extended part bent and extending from an upper end of the upright part. Such a shape is particularly suitable when the anode body has two intersecting surfaces at both ends of one of three sides intersecting each other. The protrusion part of the anode wire may be connected to the extended part. At least a part of each of the two extended parts may be housed in a corresponding one of two notched spaces.

It is desirable that the extended parts of the two anchor parts are each bent from the upper end of the upright part and extend in directions away from each other. This makes it possible to make the conductive path shorter than in a case where the two extended parts extend in directions approaching each other.

Hereinafter, examples of the configuration and constituent elements of the electrolytic capacitor (solid electrolytic capacitor) according to the present disclosure will be further described, but the configuration and constituent elements of the electrolytic capacitor are not limited to the following examples.

(Anode Body)

The porous anode body is a sintered body of a molded body of particles, and is formed of metal. The anode body is formed by forming particles as a material and sintering the molded body. Examples of the particles as a material include metal particles, alloy particles, and metal compound particles. These particles may be used singly or in combination of two or more thereof.

As a metal that forms the anode body (that is, the sintered body), a valve metal such as aluminum (Al), titanium (Ti), tantalum (Ta), niobium (Nb), zirconium (Zr), or hafnium (Hf) is used. One of these metals may be used singly, or two or more thereof may be used in combination. Of these, it is desirable to use at least one of Ta and Nb as a first metal.

The shape of the anode body is not particularly limited as long as the anode body has the characteristics described above, but for example, the anode body has a shape including a pair of main surfaces (a surface close to the mounting surface (bottom surface) and a surface close to the upper surface of the electrolytic capacitor) facing each other and side surfaces intersecting with each of such main surfaces. The anode body may have an approximately rectangular parallelepiped shape or a hexahedron shape.

The anode body may be produced by the following method. First, a part of an anode wire is buried in particles that is to be a material for the anode body, and a pressure molding on the particles is performed to form the particles into a predetermined shape. Thereafter, by sintering the obtained molded body, an anode body in which a part of the anode wire is buried is formed. Alternatively, an entirety of the anode wire is buried in the particles to be a material for the anode body, and the pressure molding on the particles is performed to form the particles into a predetermined shape. At this time, an end part of the anode wire which corresponds to the protrusion part is located at one corner of the molded body. Thereafter, remove the particles in the corner by cutting or the like and chamfer the corner to form an intersecting surface. Then, the chamfered molded body is sintered. In this way, an anode body in which a part of the anode wire is buried and the protrusion part is protruded from the intersecting surface is formed.

(Anode Wire)

The anode wire is made of metal. A part of the anode wire is buried in the anode body, and the remaining part is protruded from the anode body. That is, the anode wire includes a buried part buried in the anode body and a protrusion part protruding to the outside of the anode body.

The buried part may be extended on an extension line in an extending direction of the protrusion part. In this case, the anode wire has an approximately linear shape. However, at least one of the buried part and the protrusion part of the anode wire may be bent or have a bent part. It is desirable that the buried part has a length of more than or equal to 50% of a distance $L0$ from one side surface continuous to the intersecting surface having the protrusion part to a side surface facing the side surface. On the other hand, it is most desirable that the length of the protrusion part is equal to or less than a maximum length $L1$ that can be housed in the notched space, but for example, about 50% to 200% of $L1$ is a desirable range.

The form of the anode wire is not particularly limited as long as the anode wire has an approximately linear shape. The shape of a section perpendicular to a length direction of the anode wire may be a circular shape, an elliptical shape, a polygonal shape, or other shapes. The anode wire may have a ribbon shape in which a section perpendicular to the length direction of the anode wire has a rectangular shape.

(Dielectric layer)

The dielectric layer formed on the surface of the anode body is not particularly limited, and it may be formed by a known method. For example, the dielectric layer is formed by subjecting the anode body to an anodizing treatment and growing an oxide film on the surface of the anode body. The anodizing treatment may be performed by immersing the anode body in an anodizing solution to anodize the surface of the anode body. Alternatively, a gas phase method such as an atomic layer deposition method (ALD method) may be used, or the surface of the anode body may be oxidized by heating the anode body under an atmosphere containing oxygen.

(Cathode Part)

The cathode part includes, for example, a solid electrolyte layer. The cathode part may include a cathode layer that covers at least a part of the solid electrolyte layer. The solid electrolyte layer is not particularly limited, and solid electrolytes for use in known electrolytic capacitors may be applied. The solid electrolyte layer may be a stack of two or more different solid electrolyte layers. The solid electrolyte layer is disposed in such a manner as to cover at least a part of the dielectric layer. The solid electrolyte layer may be formed by using a manganese compound or a conductive polymer.

The conductive polymer may be a x-conjugated polymer, and examples of the conductive polymer include polypyrrole, polythiophene, polyaniline, and derivatives thereof. These polymers may be used singly, or multiple types thereof may be used in combination. The conductive polymer may be a copolymer of two or more monomers. The derivative of the conductive polymer means a polymer having the conductive polymer as a basic skeleton. For example, examples of the derivative of polythiophene include poly(3,4-ethylenedioxythiophene).

A dopant is added to the conductive polymer. The dopant can be selected depending on the conductive polymer, and a known dopant may be used. Examples of the dopant include naphthalenesulfonic acid, p-toluenesulfonic acid, polystyrenesulfonic acid, and salts thereof. An example of the solid electrolyte layer is formed with the use of poly(3,4-ethylenedioxythiophene) (PEDOT) doped with polystyrenesulfonic acid (PSS).

The solid electrolyte layer containing a conductive polymer is formed on at least part of the dielectric layer by a method of impregnating the dielectric layer with a monomer or an oligomer, and then polymerizing the monomer or the oligomer in accordance with chemical polymerization or electrolytic polymerization, or by impregnating the anode body with the dielectric layer formed, with a solution of or a dispersion liquid of the conductive polymer (and a dopant as necessary), and drying the solution or the dispersion liquid.

The cathode layer may be a conductive layer formed on the solid electrolyte layer, and may be, for example, a conductive layer formed so as to cover the solid electrolyte layer. The cathode layer may include a carbon layer formed on the solid electrolyte layer and a metal-paste layer formed on the carbon layer. The carbon layer may be made of a conductive carbon material such as graphite and a resin. The metal paste layer may be made of metal particles (for example, silver particles) and resin, and may be made of, for example, a known silver paste.

(Conductive Member)

The cathode part is connected to the connection surface of the cathode terminal by a conductive member. The conductive member is made of a material having conductivity The conductive member may be made of a material containing metal particles (for example, silver particles) and resin, and may be made of, for example, a known metal paste (for example, silver paste). The conductive member is formed by heating the metal paste. The conductive member may be formed of a plurality of conductive layers of different types.

(Outer Package)

The outer package is disposed around the capacitor element so that the capacitor element is not exposed on the surface of the electrolytic capacitor. The outer package insulates the anode terminal and the cathode terminal. The outer package is made of, for example, a resin composition containing a resin and an insulating filler. The outer package may be formed by housing the capacitor element in a mold, introducing a resin composition containing an uncured thermosetting resin into the mold by a transfer molding method, a compression molding method, or the like, and curing the thermosetting resin.

Examples of the insulating resin constituting the outer package include an epoxy resin, a phenol resin, a silicone resin, a melamine resin, a urea resin, an alkyd resin, polyurethane, polyimide, and unsaturated polyester.

Examples of the insulating filler include insulating particles and insulating fibers, and particles are preferable. Examples of the insulating material forming the insulating filler include insulating compounds (e.g., oxides) such as silica and alumina, glass, and mineral materials (e.g., talc, mica, or clay). The insulating filler contained in the outer package may be one type or two or more types.

The content proportion of the insulating filler in the outer package is not particularly limited, and the content proportion may be in a range from 30 mass % to 95 mass %, inclusive, (for example, in a range from 50 mass % to 90 mass %, inclusive).

(Anode Terminal)

The anode terminal (anode lead frame) is electrically connected to the anode part. The anode terminal includes a first internal terminal part buried in the outer package, and a first external terminal part at least a part of which is exposed from the outer package. The first internal terminal part and the anode part may be connected by welding or the like. At least a part of the external terminal part functions as a terminal electrode to be connected to a circuit member, and soldering or the like is performed. The anode terminal may be formed by, for example, processing a sheet of metal (copper, copper alloy, or the like) (including a metal plate and a metal foil) by a known metal processing method.

(Cathode Terminal)

The cathode terminal (cathode lead frame) is electrically connected to the cathode part. The cathode terminal includes a second internal terminal part buried in the outer package, and a second external terminal part at least a part of which is exposed from the outer package. The second internal terminal part and the cathode part may be connected by a conductive member. At least a part of the second external terminal part functions as a terminal electrode to be connected to a circuit member, and soldering or the like is performed. The cathode terminal may be formed by, for example, processing a sheet of metal (copper, copper alloy, or the like) (including a metal plate and a metal foil) by a known metal processing method.

Hereinafter, a more specific description will be provided with reference to the drawings, but the following examples are not considered to limit the present invention. The drawings presented below are schematic and are not considered accurately reflect the shape, dimensions, number, or the like of actual members.

Figure 2A:
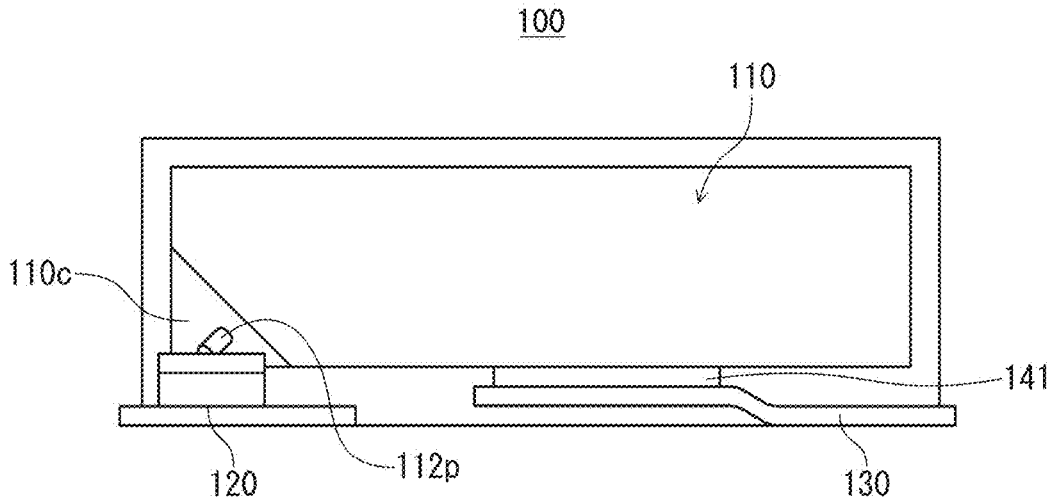
FIG. 2A is a schematic side view illustrating an example of the electrolytic capacitor in FIG. 1 seen through an outer package.
Figure 2B:
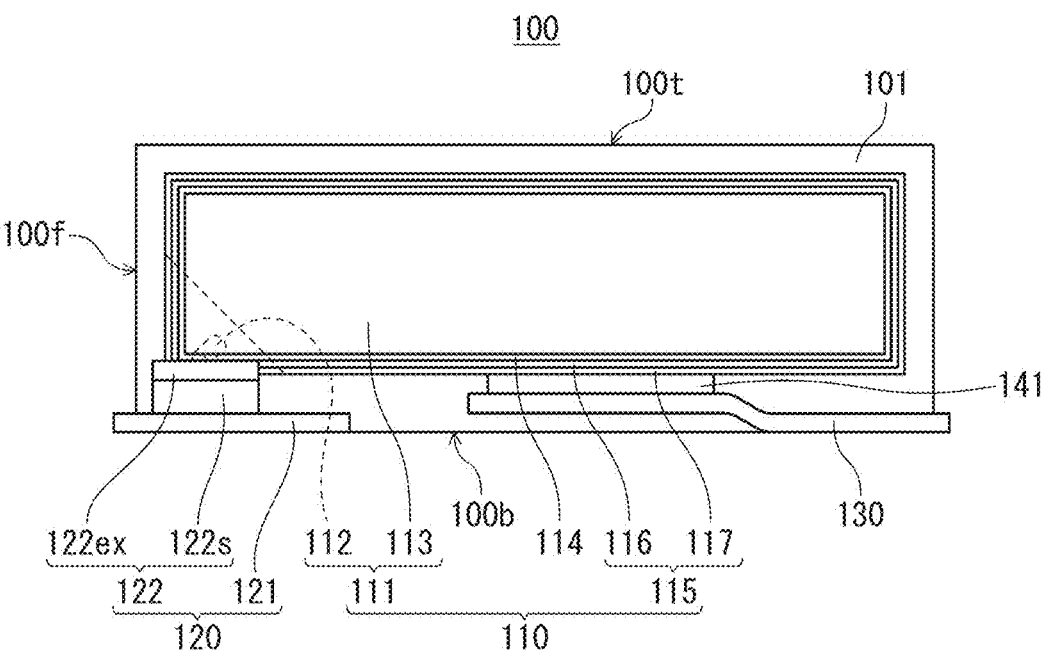
FIG. 2B is a sectional view taken along line B-B illustrating an internal structure of the capacitor element in FIG. 1.
Figure 3:
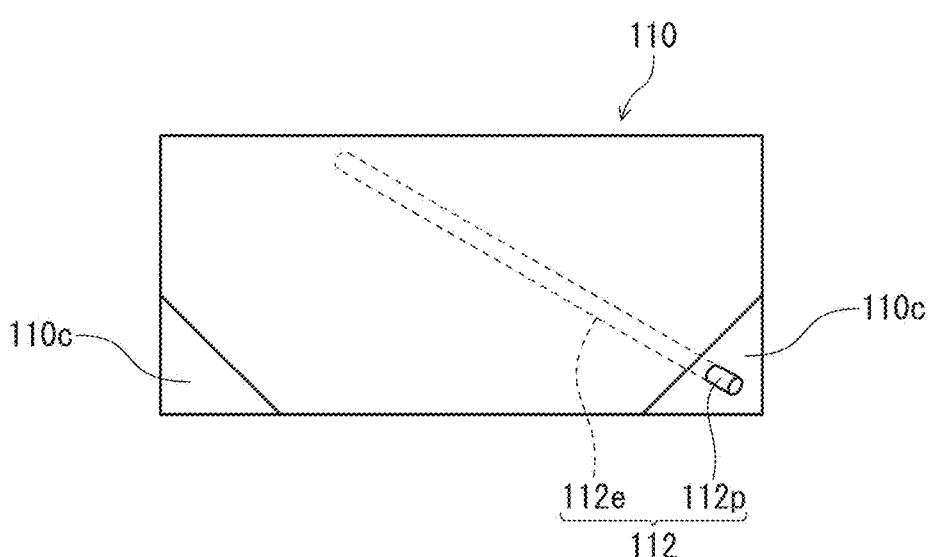
FIG. 3 is a schematic front view illustrating an example of a capacitor element according to the exemplary embodiment of the present disclosure.
Figure 4:
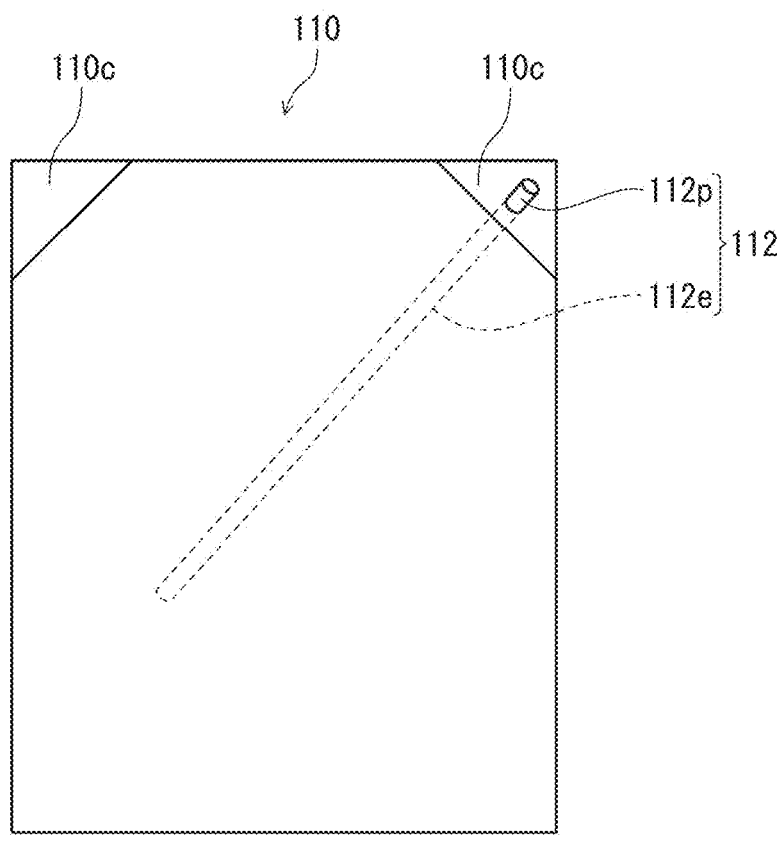
FIG. 4 is a schematic bottom view illustrating the capacitor element in FIG. 3.
Figure 5:
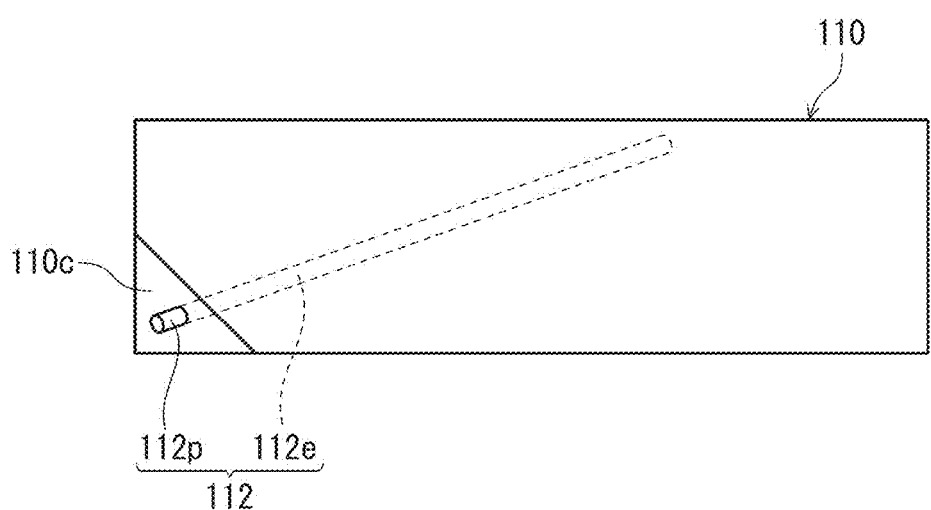
FIG. 5 is a schematic side view illustrating the capacitor element in FIG. 3.
Figure 6:
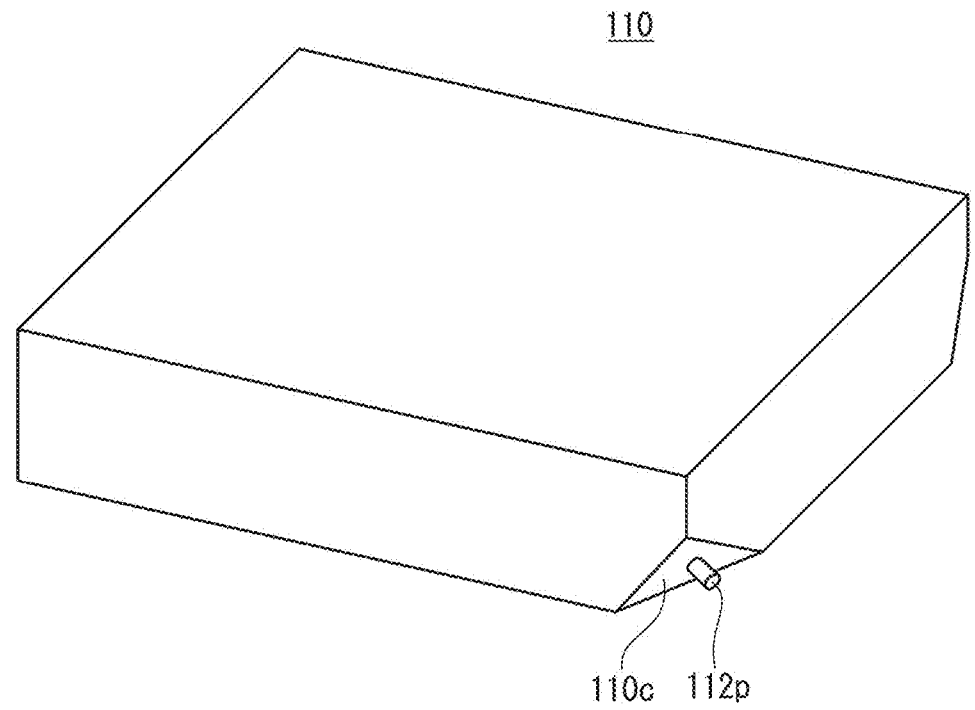
FIG. 6 is a schematic perspective view illustrating the capacitor element in FIG. 3.

FIG. 1 is a schematic front view illustrating electrolytic capacitor 100 according to an exemplary embodiment of the present disclosure. FIG. 2A is a schematic side view illustrating an example of electrolytic capacitor 100. In FIGS. 1 and 2A, an internal structure (capacitor element 110, an anode terminal, and a cathode terminal) of electrolytic capacitor 100 is illustrated through a part of an outer package of electrolytic capacitor 100. FIG. 2B is a sectional view taken along line B-B in FIG. 1, illustrating an internal structure of capacitor element 110. FIG. 3 is a schematic front view illustrating capacitor element 110 included in electrolytic capacitor 100. FIG. 4 is a schematic bottom view illustrating capacitor element 110. FIG. 5 is a schematic side view illustrating capacitor element 110. FIG. 6 is a schematic perspective view illustrating capacitor element 110.

Electrolytic capacitor 100 includes capacitor element 110 having an approximately rectangular parallelepiped or a hexahedral shape. The shape of electrolytic capacitor 100, which reflects the shape of capacitor element 110, is approximately a rectangular parallelepiped shape or a hexahedron shape. One of the six surfaces of such electrolytic capacitor 100 is mounting surface (or bottom surface) 100b facing a circuit member when mounted on the circuit member, and a surface opposite to mounting surface 100b is upper surface 100t.

Outer package 101 is disposed around capacitor element 110. That is, capacitor element 110 is sealed by outer package 101. Outer package 101 is made of, for example, a resin composition containing a resin and an insulating filler.

Capacitor element 110 includes anode part 111 and cathode part 115. Anode part 111 includes anode body 113 and anode wire 112. Anode wire 112 includes buried part 112e buried in anode body 113 and protrusion part 112p protruding to the outside of anode body 113. Buried part 112e is extended on an extension line in an extending direction of protrusion part 112p. Dielectric layer 114 is formed on a surface of anode body 113.

Cathode part 115 includes solid electrolyte layer 116 and cathode layer 117. Solid electrolyte layer 116 is disposed in such a manner as to cover dielectric layer 114. Cathode layer 117 is, for example, a carbon layer formed on solid electrolyte layer 116, and a metal paste layer formed on the carbon layer. The metal paste layer is made of, for example, a silver paste containing silver particles and a resin.

Anode terminal 120 is electrically connected to anode part 111 (protrusion part 112*p* of anode wire 112) of capacitor element 110. Cathode terminal 130 is electrically connected to cathode part 115 via conductive member 141. Part of anode terminal 120 and part of cathode terminal 130 extend as external terminal parts to the outside of outer package 101, and are exposed on mounting surface (or bottom surface) 100*b*. A portion of the external terminal part exposed at least on mounting surface 100*b* is used as a terminal electrode for electrically connecting electrolytic capacitor 100 to the circuit member.

In capacitor element 110, anode body 113 has eight corners defined by three sides intersecting each other. Two of the eight corners are chamfered by intersecting surface 110*c* having a plane shape. Two intersecting surfaces 110*c* are provided at respective corners of electrolytic capacitor 100 located close to mounting surface 100*b*. Two intersecting surfaces 110*c* are formed at respective both ends of one side located close to mounting surface 100*b* and front surface 100*f* of anode body 113. With such a configuration, anode body 113 has two notched spaces. Protrusion part 112*p* is protruded from one of two intersecting surfaces 110*c*. One of two intersecting surfaces 110*c* is a planting surface of anode wire 112. Protrusion part 112*p* is inclined to extend from intersecting surface 110*c* toward mounting surface 100*b*, and is connected to an internal terminal part of anode terminal 120 disposed close to mounting surface 100*b*. In the above configuration, the conductive path can be shortened since intersecting surface 110*c* from which protrusion part 112*p* of anode wire 112 is protruded is close to mounting surface 100*b*.

Protrusion part 112*p* is housed in the notched space. As viewed from a surface of the anode body that is not adjacent to intersecting surface 110*c*, protrusion part 112*p* is completely hidden by anode body 113. Thus, the volume efficiency of electrolytic capacitor 100 can be maximized.

Anode terminal 120 includes bottom-side terminal part (at least a part of the external terminal part) 121 exposed on mounting surface (bottom surface) 100*b*, and two anchor parts (at least a part of the internal terminal part) 122 each extending from bottom-side terminal part 121 and buried in outer package 101. Two anchor parts 122 extend toward two intersecting surfaces 110*c*, respectively. One of two anchor parts 122 is connected to protrusion part 112*p*. Anchor part 122 is buried in the outer package to make anode terminal 120 fix to outer package 101 so as to prevent anode terminal 120 from coming off from outer package 101. Anchor part 122 is also used as a connecting part with anode wire 112. A part of anchor part 122 is housed in the notched space, which further enhances the volume efficiency of electrolytic capacitor 100.

Specifically, bottom-side terminal part 121 has two end sides 121*e* facing each other, and each of two anchor parts 122 includes upright part 122*s* rising from a corresponding one of two end sides 121*e* of bottom-side terminal part 121 toward the upper surface, and extended part 122*ex* bent and extending from the upper end of the upright part 122*s* Two extended parts 122*ex* are bent from the upper end of upright part 122*s* and extend in directions away from each other. This makes it possible to form two extended parts 122*ex* in a shape that is easily housed in the notched space and to further shorten the conductive path with anchor part 122. One side of extended part 122*ex* is electrically connected to protrusion part 112*p* by welding or the like in the notched space.

The electrolytic capacitor according to the present disclosure can be used for various applications requiring both high capacity and downsizing.

Although the present invention has been described in terms of presently preferred exemplary embodiments, such disclosure should not be construed in a limiting manner. Various modifications and alterations will undoubtedly become apparent to the person of ordinary skill in the art to which the present invention belongs upon reading the above disclosure. Thus, the appended scope of claims should be construed to cover all modifications and alterations without departing from the true spirit and scope of the present invention.

The invention claimed is:

1. An electrolytic capacitor comprising:
an anode body that is porous;
an anode wire including a buried part buried in the anode body and a protrusion part protruding to an outside of the anode body;
a dielectric layer disposed on a surface of the anode body;
a cathode part covering at least a part of the dielectric layer;
an anode terminal electrically connected to the anode wire;
a cathode terminal electrically connected to the cathode part; and
an outer package covering the anode body, wherein:
a corner defined by three sides of the anode body is chamfered by an intersecting surface intersecting each of the three sides, the three sides intersecting each other,
the protrusion part is protruded from the intersecting surface and is connected to the anode terminal,
two intersecting surfaces are disposed at respective both ends of one of the three sides, the two intersecting surfaces including the intersecting surface,
the outer package includes a bottom surface and an upper surface opposite to the bottom surface,
the anode terminal includes a bottom-side terminal part and two anchor parts, the bottom-side terminal part being exposed from the outer package at the bottom surface, the two anchor parts each extending from the bottom-side terminal part and buried in the outer package, and
each of the two anchor parts extends toward a corresponding one of the two intersecting surfaces, and the protrusion part is connected to a corresponding one of the two anchor parts.

2. The electrolytic capacitor according to claim 1, wherein the intersecting surface has a plane or a curved surface.

3. The electrolytic capacitor according to claim 1, wherein the protrusion part is housed in a notched space formed by the intersecting surface and the corner chamfered by the intersecting surface.

4. The electrolytic capacitor according to claim 1, wherein the protrusion part is protruded from only one of the two intersecting surfaces.

5. The electrolytic capacitor according to claim 1, wherein:
the bottom-side terminal part includes two end sides facing each other, each of the two anchor parts includes an upright part and an extended part, the upright part rising from a corresponding one of the two end sides of the bottom-side terminal part toward the upper surface, the extended part being bent and extending from an upper end of the upright part, and the protrusion part is connected to the extended part.

6. The electrolytic capacitor according to claim 5, wherein extended parts of the two anchor parts are each bent from the upper end of the upright part and extend in directions away from each other, the extended parts including the extended part.

* * * * *